United States Patent [19]

Nishikuma et al.

[11] Patent Number: 5,048,859
[45] Date of Patent: Sep. 17, 1991

[54] SUSPENSION FOR STEERABLE DRIVING WHEEL IN VEHICLE

[75] Inventors: Yasushi Nishikuma; Seiho Kawakami; Kazukiyo Itoga; Shigenori Mae, all of Toyota; Toshiyasu Santo, Susono, all of Japan

[73] Assignee: Toyota Jidosha Kabushiki Kaisha, Aichi, Japan

[21] Appl. No.: 530,781

[22] Filed: May 30, 1990

[30] Foreign Application Priority Data

Jun. 13, 1989 [JP] Japan .................................. 1-150139

[51] Int. Cl.$^5$ ................................................ B60G 3/00
[52] U.S. Cl. ..................................... 280/668; 180/253; 188/18 A
[58] Field of Search ................. 280/660, 668; 180/253; 188/18 A

[56] References Cited

U.S. PATENT DOCUMENTS

| | | | |
|---|---|---|---|
| 3,757,883 | 9/1973 | Asberg | 188/18 A |
| 3,877,716 | 4/1975 | Ostwald | 280/96.3 |
| 4,756,517 | 7/1988 | Kakimoto | 280/668 |
| 4,792,020 | 12/1988 | Okumura et al. | 188/18 A |
| 4,844,505 | 7/1989 | Higuchi | 280/663 |

*Primary Examiner*—Kenneth R. Rice
*Attorney, Agent, or Firm*—Oliff & Berridge

[57] ABSTRACT

A suspension for a steerable driving wheel in a vehicle, in which a wheel supported by a wheel carrier rotatable around a steering axis is driven by a drive shaft and braked by a brake caliper, includes a hub and a brake disk. The hub has a supported portion rotatably supported by the wheel carrier through a bearing and is unrotatably connected to the drive shaft. The hub attaches the wheel to a portion located more laterally outward of a vehicle body than the supported portion. On the other hand, the brake disk for generating a braking force in cooperation with the brake caliper is provided on the hub and disposed more laterally inward of the vehicle body than said supported portion.

14 Claims, 7 Drawing Sheets

SUSPENSION FOR STEERABLE DRIVING WHEEL IN VEHICLE

BACKGROUND OF THE INVENTION

1. Field of the Invention

This invention relates to a suspension for a steerable driving wheel in a vehicle and, more particularly, to a suspension in a vehicle provided with a wheel carrier rotatable around a steering axis, a hub for transmitting a driving force from a drive shaft to a wheel, and a brake disk for transmitting a brake force generated in cooperation with a brake caliper to the hub.

2. Description of the Prior Art

Figure 9:
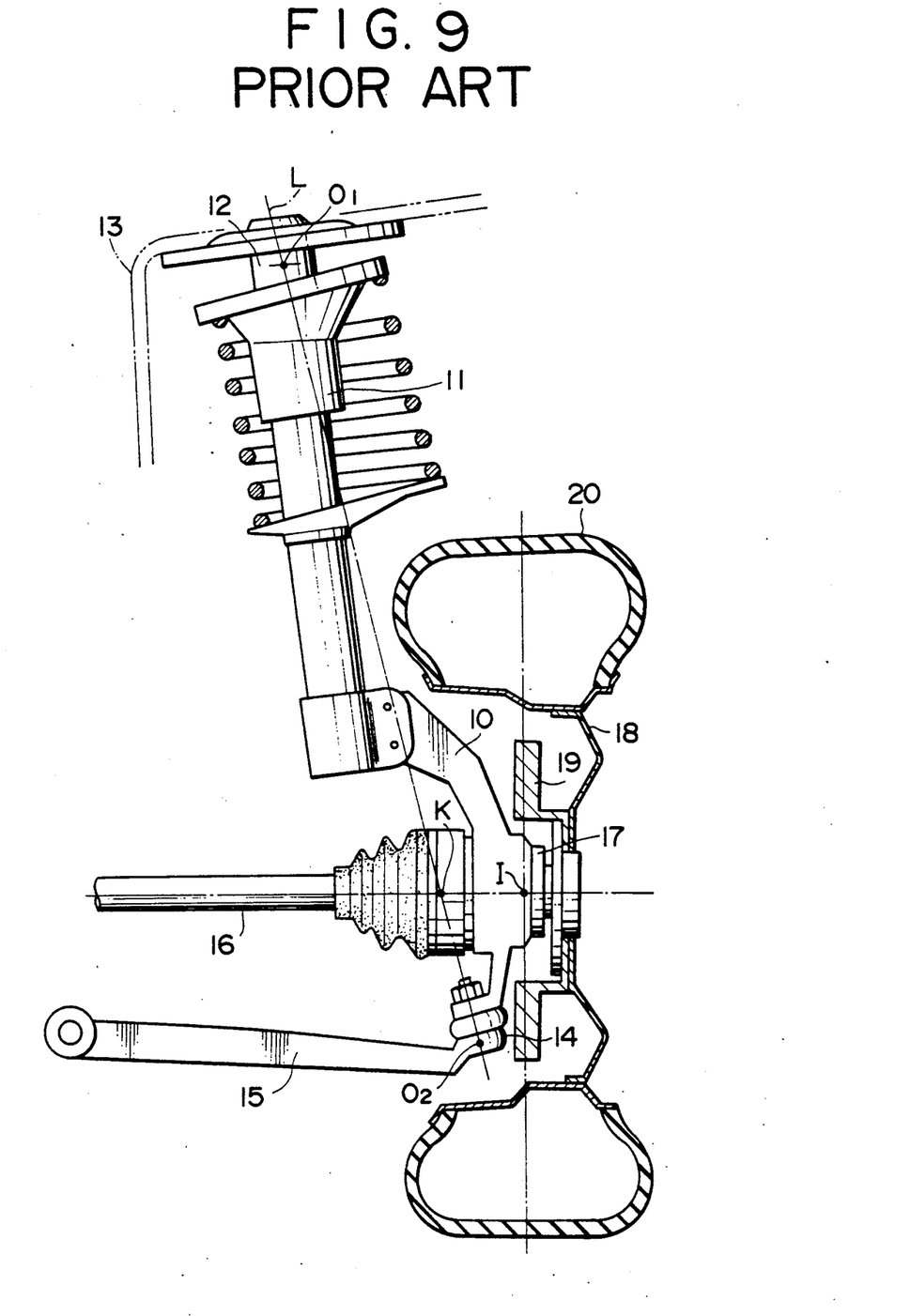
FIG. 9 is a front view, partly in section, showing a prior art suspension.

As one of suspensions for a steerable driving wheel, there is a strut type suspension as shown in FIG. 9 (for instance, as described in "Repairs for Vista" issued Mar. 24, 1982 by Toyota Jidosha Kabushiki Kaisha, on Page 3-33).

In the suspension, a wheel carrier 10 has an upper portion firmly fixed to a strut 11, and the strut 11 is swingably supported to a vehicle body 13 through a support 12. The wheel carrier 10 has a lower portion swingably connected to a suspension arm 15 through a ball joint 14. Thereby, the wheel carrier 10 is permitted to rotate around a steering axis L (king pin axis) interconnecting the center $O_1$ of the support 12 and the center $O_2$ of the ball joint 14.

On the other hand, a drive shaft 16 is unrotatably connected to a hub 17 rotatably supported by the wheel carrier 10 through a bearing (not shown), and a disk wheel 18 of a wheel and a brake disk 19 are attached to the hub 17. The brake disk 19 generates a braking force in cooperation with a brake caliper (not shown).

The point where a rotary axis of a tire 20 and a vertical plane passing through the center of the grounding contact surface of the tire 20 intersect each other is defined as I point where, and a point the rotary axis of the tire 20 and the steering axis L intersect each other in a condition to be projected on a surface parallel to the surface of FIG. 9 is defined as K point the driving force from the drive shaft 16 acts on the rotary axis of the tire at the time of driving of the vehicle, and a moment proportional to the I-K distance is generated by the driving force to make the tire tend to rotate around the steering axis L. Accordingly, since a steering wheel or handle is forced to be moved, a so-called steering effort is necessary to resist it.

The I-K distance has to be made small in order to lessen the steering effort. For that end, the center $O_1$ of the support 12 or the center $O_2$ of the ball joint 14 may be located laterally as outward as possible of the vehicle. However, it is difficult to change the position of the center $O_1$ of the support 12 by reason of the spacial restriction in a car room or an engine room, or the prevention of interference of the strut 11 with the tire 20. Also, the center $O_2$ of the ball joint 14 is naturally limited in bringing its position outward in consideration that the brake disk 19 is located laterally outward of the ball joint 14 and the disk wheel 18 is incapable of varying its shape since the disk wheel 18 requires interchangeability.

There is a double wishbone type suspension (Japanese Patent Publication No. 52-9889), in which a wheel carrier is supported by two upper links swingably connected to two portions of the wheel carrier located longitudinally at an interval above a rotary axis of a wheel, and two lower links swingably connected to two portions of the wheel carrier located longitudinally at an interval below the rotary axis of the wheel. According to the double wishbone type suspension, the line interconnecting respective imaginary intersections of two upper links and two lower links functions as an imaginary steering axis.

The above-mentioned strut type suspension has the extremely small degree of freedom in design of the steering axis for making the I-K distance small. The conventional double wishbone type suspension involves the similar problem to that of the strut type suspension.

In case of the double wishbone type suspension as described in the above publication, in which the wheel carrier rotates around the imaginary steering axis, the I-K distance can be made small. On the other hand, rotation of the wheel carrier around the imaginary steering axis means that the connection points of the wheel carrier and the links are displaced to make the wheel carrier rotate around the imaginary steering axis seemingly. Thus, the alignment of the wheel is varied with the steering operation.

SUMMARY OF THE INVENTION

An object of the present invention is to provide a suspension for a steerable driving wheel in a vehicle, which not only makes the I-K distance small, but also improves the degree of freedom in design of a steering axis by varying the arrangement of the components.

Another object of the present invention is to provide a suspension for a steerable driving wheel in a vehicle, which permits the reduction of an alignment change accompanying the steering operation.

According to the present invention, a suspension in a vehicle, in which a wheel supported by a wheel carrier rotatable around a steering axis is driven by a drive shaft, and braked by a brake caliper, comprises a hub having a supported portion rotatably supported by the wheel carrier through a bearing, the hub being unrotatably connected to the drive shaft and attaching the wheel to a portion located more laterally outward of a vehicle body than the supported portion, and a brake disk for generating a braking force in cooperation with the brake caliper, the brake disk being provided on the hub and disposed more laterally inward of the vehicle body than the supported portion, wherein the wheel carrier is swingably connected to a suspension arm at a portion located below the supported portion.

In a case where the suspension is of a strut type, the steering axis is an axis interconnecting the center of a support connecting an upper end of the strut to the vehicle body and the center of the connection between the portion of the wheel carrier located below the supported portion of the hub and the suspension arm.

In a case where the suspension is of a double wishbone type, the steering axis is an axis interconnecting the center of the connection between an upper suspension arm for supporting the wheel carrier and an upper portion of the wheel carrier and the center of the connection between the portion of the wheel carrier located below the supported portion of the hub and the suspension arm.

Since the brake disk is located more laterally inward of the vehicle body than the supported portion of the hub, the connection between the portion of the wheel carrier located below the supported portion of the hub and the suspension arm is disposed laterally as outward as possible of the vehicle body, so that the I-K distance can be made small. Thus, the steering effort is lessened.

As a result that a determinable range of the steering axis is expanded without interfering with the brake disk, the degree of freedom in design of the steering axis is sharply improved.

In case of a so-called inboard type brake devices, in which a brake drum is disposed on a portion of the drive shaft spaced apart from the hub laterally inward of the vehicle body to obtain a braking force therein, vibrations are produced with braking operation. However, according to the present invention, the brake disk is provided on the hub, so that the vibrations are few, in comparison with the inboard type brake device.

The steering axis is an axis, around which the wheel carrier rotates actually. Thus, this steering axis is different from the imaginary steering axis, that is, the axis seemingly obtained through the displacement of the connections between the wheel carrier and the links, so that the alignment change accompanying the steering operation is lessened.

Since the brake disk is disposed more laterally inward of the vehicle body than the supported portion of the hub, the brake disk can be disposed as close as possible to the flow of air generated in travelling, in comparsion with the conventional suspension, in which the brake disk is disposed radially inward of a rim portion of the disk wheel. Accordingly, the brake disk improves in cooling performance. Also, since the brake disk can be disposed at a position out of the minimum inner diameter portion of the rim for supporting a tire, the diameter of the brake disk is made larger to thereby improve the braking performance.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
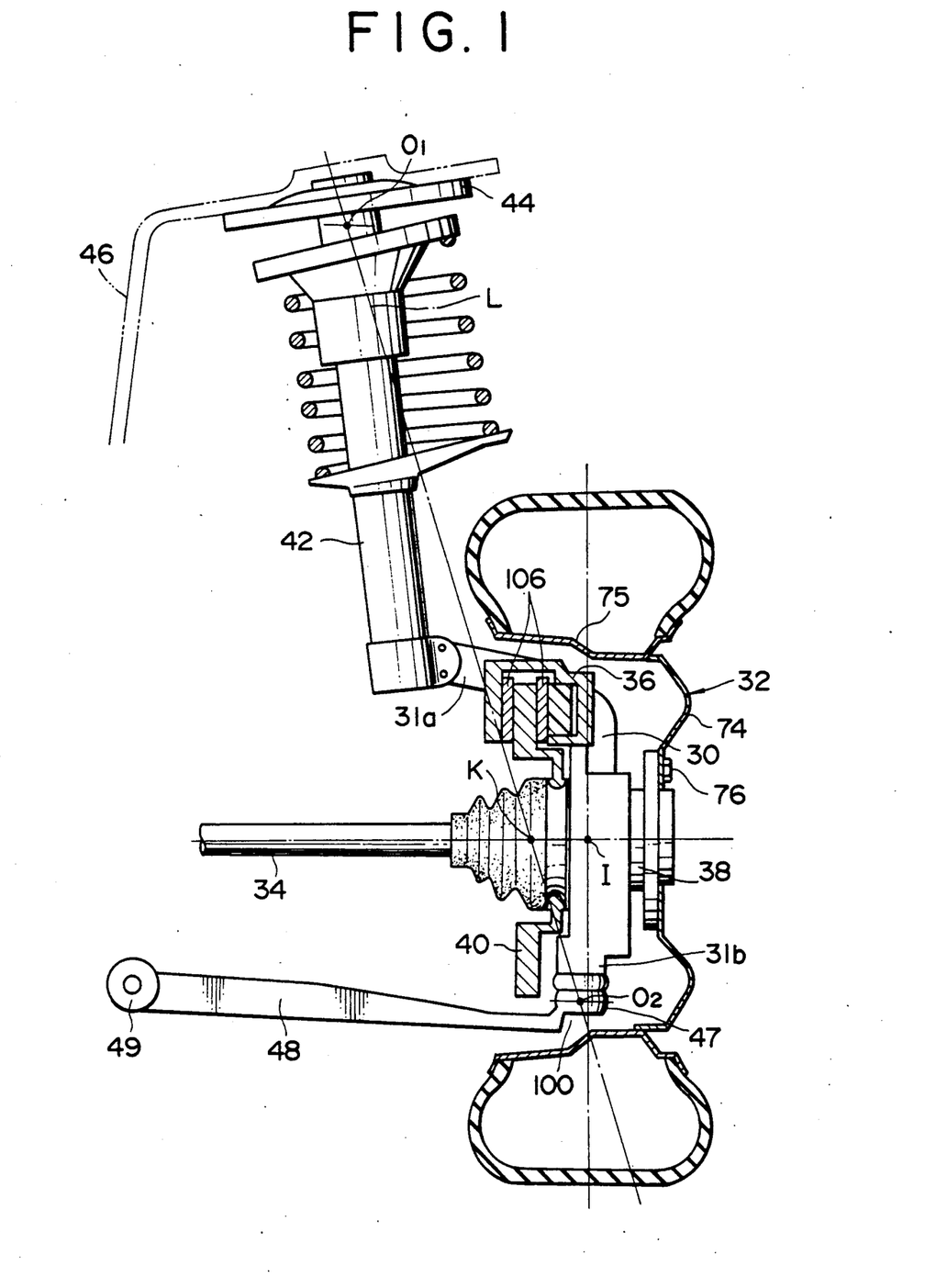
FIG. 1 is a front view, partly in section, showing an embodiment of a suspension according to the present invention.
Figure 2:
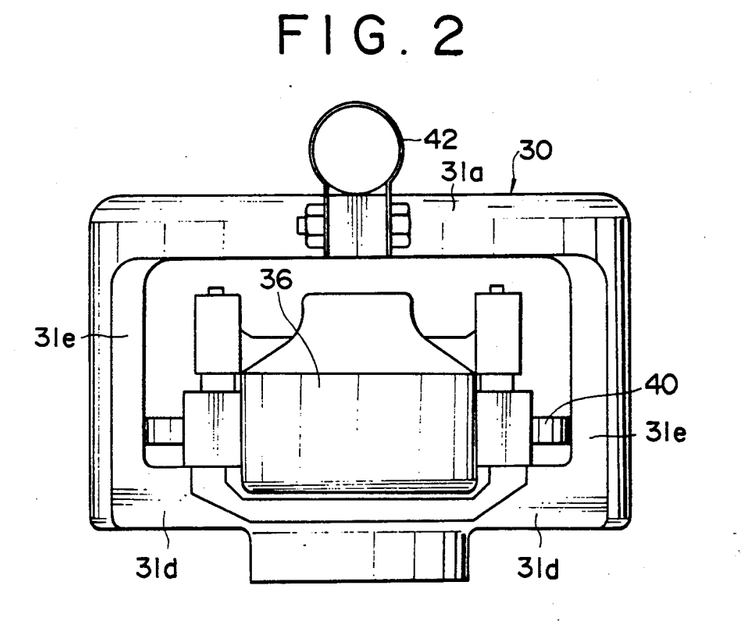
FIG. 2 is an enlarged-scale plan view showing a wheel carrier and a brake caliper of the suspension shown in FIG. 1.
Figure 3:
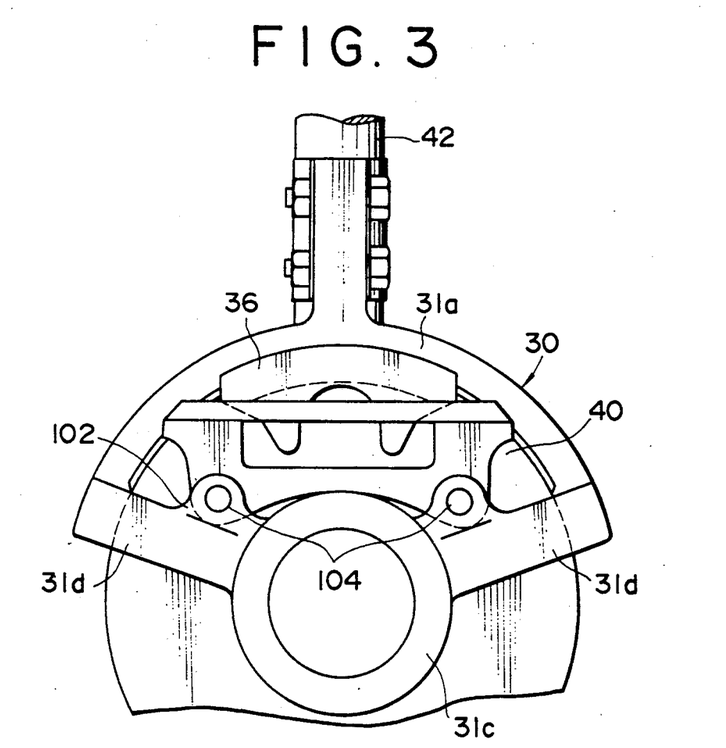
FIG. 3 is a side view showing the wheel carrier and the brake caliper shown in FIG. 2.

As shown in FIGS. 1 through 3, a suspension in a vehicle, in which a wheel 32 supported by a wheel carrier 30 rotatable around a steering axis L is driven by a drive shaft 34 and braked by a brake caliper 36, comprises a hub 38 and a brake disk 40.

In an embodiment shown in FIGS. 1 through 3, the suspension is of a strut type, and the wheel carrier 30 has an upper portion 31a firmly fixed to a strut 42. An upper portion of the strut 42 is connected to a vehicle body 46 through a support 44 of a structure known per se to be swingable around the center $O_1$ of the support 44.

A portion 31b of the wheel carrier 30 below a supported portion of the hub 38, which will be later described, is swingably connected to a suspension arm 48 through a ball joint 47. The suspension arm 48 is swingably connected to the vehicle body through a rubber bushing 49 disposed on an inner end of the suspension arm 48.

The steering axis L is provided as a straight line connecting the center $O_1$ of the support 44 with the center $O_2$ of the ball joint 47. The wheel carrier 30 is connected, as is known in the art, to a tie rod through a knuckle arm (not shown) to be steered by a steering gear.

The hub 38 has a supported portion rotatably supported by the wheel carrier 30 through a bearing, and is unrotatably connected to the drive shaft 34. The wheel 32 is attached to a portion of the hub 38 located more laterally outward of the vehicle body than the supported portion.

The brake disk 40 generates a braking force in cooperation with the brake caliper 36, and is provided on the hub 38 to be disposed more laterally inward of the vehicle body than the supported portion.

Figure 5:
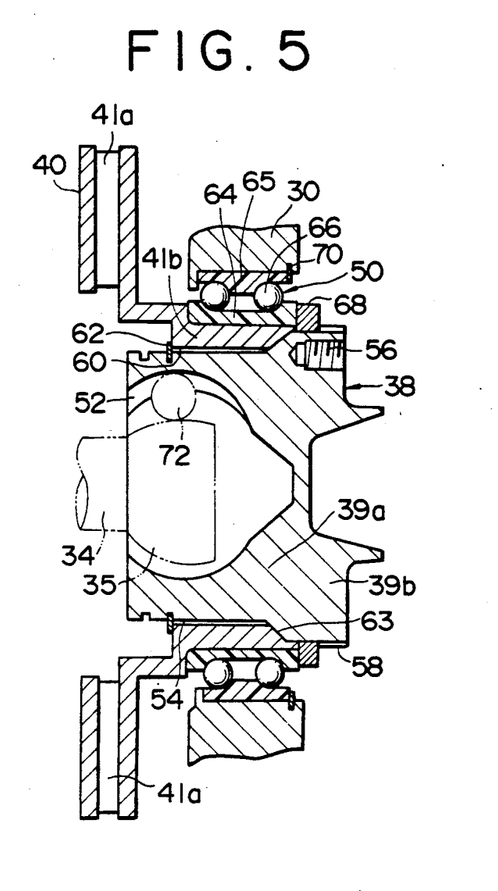
FIGS. 5 through 7 are sectional views respectively showing a hub for use in the suspension.

In an embodiment shown in FIG. 5, the hub 38 has a supported portion 39a rotatably supported by the wheel carrier 30 through a bearing 50, and a disk wheel mounting portion 39b disposed more laterally outward of the vehicle body than the supported portion 39a. The supported portion 39a has a plurality of ball grooves 52 provided on an inner peripheral surface and spaced at circumferentially uniform intervals, and serves as a casing of a constant velocity joint. An outer peripheral surface of the supported portion 39a is provided with a spline 54. On the other hand, the mounting portion 39b has a plurality of bolt holes 56 spaced at circumferentially uniform intervals and a screw 58 provided on the outer peripheral surface.

The brake disk 40 has radiating gaps 41a, and is provided integrally with a cylindrical connecting portion 41b. An inner peripheral surface of the connecting portion 41b is provided with a spline 60. The spline 60 of the connecting portion 41b is fitted to the spline 54 of the supported portion 39a of the hub 38, and the connecting portion 41b is firmly fixed to the supported portion 39a by means of a stop ring 62 and an inclined surface 63. Thus, the brake disk 40 is attached to the hub 38 to be located more laterally inward of the vehicle body than the supported portion 39b of the hub 38.

The bearing 50 includes an inner race 64, an outer race 65 and a plurality of balls 66. The inner race 64 is press fitted into the connecting portion 41b of the brake disk 40 to be pressed against a shoulder of the connecting portion 41b. A ring 68 is screwed into the screw 58 of the mounting portion 39b of the hub 38, and then fastened thereto to fix the inner race 64, while a fastening force is adjusted to change the size of pre-load to the bearing 50. The outer race 65 is fixed to the wheel carrier 30 by means of a stop ring 70 and a shoulder of the wheel carrier. Two rows of balls 66 are arranged between the inner race 64 and the outer race 65.

A race 35 with ball grooves provided on an end of the drive shaft 34 is inserted into the supported portion 39a of the hub 38, and a ball 72 of a size extending from each ball groove of the race 35 to each ball groove 52 of the hub 38 is disposed between the race 35 and the hub 38 to constitute a constant velocity joint. The drive shaft 34 and the hub 38 are unrotatably connected to each other through this constant velocity joint. A disk wheel 74 (See FIG. 1) of the wheel 32 is placed on the mounting portion 39b of the hub 38, and a bolt 76 extending through a bolt hole of the disk wheel 74 is screwed into the bolt hole 56. Thus, the disk wheel 74 is attached to the hub 38.

In the embodiment shown in FIG. 5, the hub 38 serves as the casing of the constant velocity joint, and besides, the drive shaft 34 is connected to the hub 38, while the disk wheel of the wheel is attached to the hub 38, so that the satisfactory high concentricity of the drive shaft connecting portion to the disk wheel mounting portion is easily obtained. Also, a spline working, for example, for combining the drive shaft connecting portion and the disk wheel mounting portion together in the rotary direction is dispensable.

Figure 6:
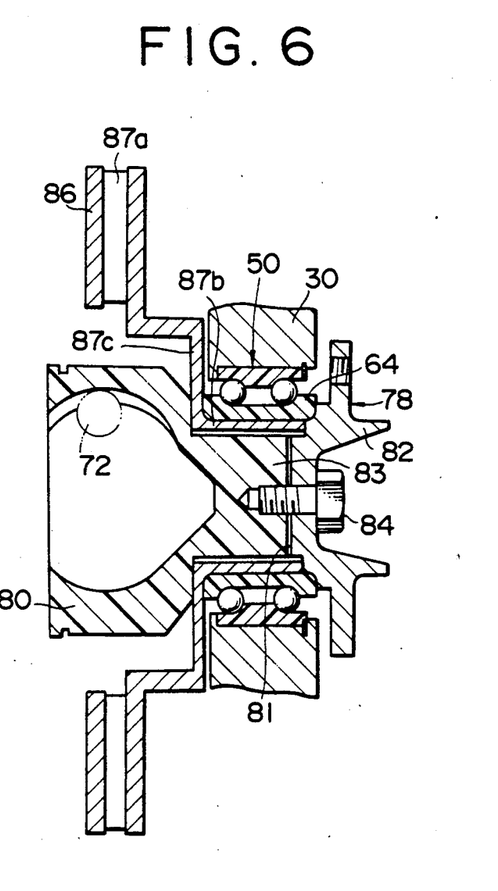

In an embodiment shown in FIG. 6, a hub 78 includes two members 80,82. Radial grooves 81 are worked on a surface of each of the members confronting each other. The radial grooves 81 are brought into engagement with each other, and bolts 84 are threaded therein. Thus, both members 80,82 are united to constitute the hub 78. The radial grooves 81 ensure the concentricity of both members, and also restrict the rotary direction. When both members are united, a supported portion 83 is formed to be rotatably supported by the wheel carrier 30 through the bearing 50. And, a portion of the member 82 located more laterally outward of the vehicle body than the supported portion 83 functions as a disk wheel mounting portion.

Similarly to the above-mentioned brake disk 40, a brake disk 86 has radiating gaps 87a, and is provided integrally with a cylindrical connecting portion 87b. The brake disk 86 is further provided integrally with a larger-diameter portion 87c extending from the connecting portion 87b radially outward. The larger-diameter portion 87c permits the brake disk 86 to be located radially outward of the drive shaft connecting portion of the member 80. A spline provided on the connecting portion 87b is fitted to a spline of the supported portion 83 of the hub 78, and the connecting portion 87b and the larger-diameter portion 87c are sandwiched between both members 80,82. Thus, the brake disk 86 is attached to the hub 78 to be located more laterally inward of the vehicle body than the supported portion 83 of the hub 78.

In the embodiment shown in FIG. 6, preload is applied to the inner race 64 by the member 82, though the bearing 50 is similar to that in the embodiment shown in FIG. 5. The other constitution of the embodiment shown in FIG. 6 is similar to that of the embodiment shown in FIG. 5.

Figure 7:
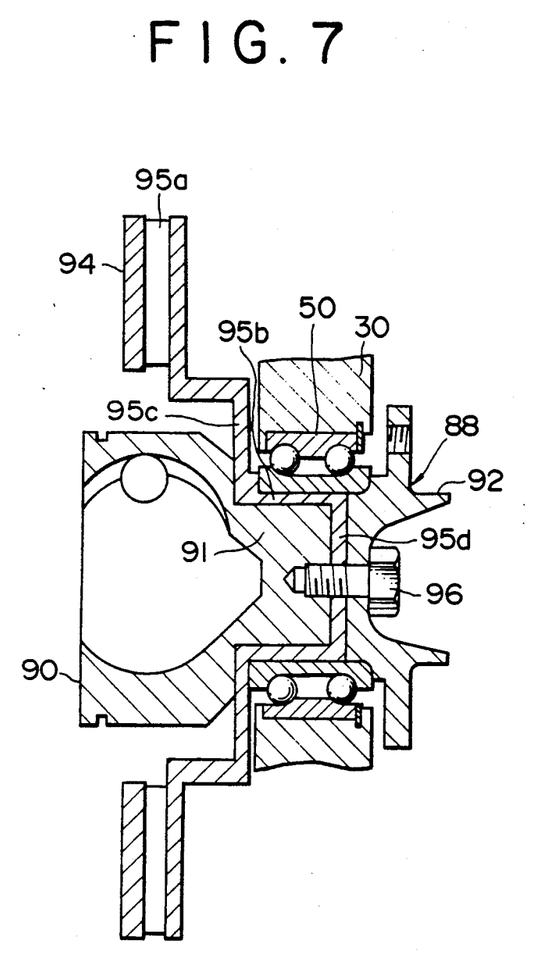

In an embodiment shown in FIG. 7, a hub 88 includes two members 90,92. On the other hand, a brake disk 94 has radiating gaps 95a, and is provided integrally with a cylindrical connecting portion 95b and a larger-diameter portion 95c. The brake disk 94 is further provided with a contact portion 95d united with the connecting portion 95b. The connecting portion 95b of the brake disk 94 is press fitted to the member 90, then the contact portion 95d is brought into closely contact with both members 90,92 to be sandwiched between both members 90, 92, and then bolts 96 are screwed. Thus, the hub 88 is constituted and simultaneously the brake disk 94 is attached to the hub 88. Radial grooves (not shown) are provided on each of the confronting surfaces of the contact portion 95d of the brake disk 94 and the respective members 90,92 to restrict the rotary direction.

When two members 90,92 are combined together through the brake disk 94 to unite, a supported portion 91 is formed to be rotatably supported by the wheel carrier 30 through the bearing 50. A portion of the member 92 located more laterally outward of the vehicle body than the supported portion 91 functions as a disk wheel mounting portion, and the brake disk 94 is located more laterally inward of the vehicle body than the supported portion 91 of the hub 88.

The other constitution of the embodiment shown in FIG. 7 is substantially similar to that of the embodiment shown in FIG. 5.

In the embodiments shown in FIGS. 5 through 7, the brake disk is provided with the connecting portion, which is fitted to the supported portion of the hub, and the brake disk is located more laterally inward of the vehicle body than the supported portion. Also, the inner race of the bearing is press fitted to the connecting portion, and the hub is supported by the wheel carrier through the connecting portion of the brake disk and the bearing.

Instead of the aforementioned constitution, the brake disk may be formed integrally with the hub so as to project from an end of the hub, and a portion of the hub located more laterally outward of the vehicle body than the brake disk is permitted to function as a supported portion to press fit the inner race of the bearing to the supported portion. The hub is supported by the wheel carrier through the bearing, so that the brake disk is located more laterally inward of the vehicle body than the supported portion.

The brake disk 40 provided on the hub 38 is disposed more laterally inward of the vehicle body than the supported portion of the hub 38, i.e., at the center side of the vehicle body, so that a space 100 is ensured radially inward of a rim portion 75 of the disk wheel 74 of the wheel 32, as shown in FIG. 1. Thus, the portion 31b of the wheel carrier 30 below the supported portion is capable of being connected to the suspension arm 48 through the ball joint 47 disposed in the space 100. By so doing, the rotary center $O_2$ of the ball joint 47 is brought as outward as possible in the lateral direction of the vehicle body to permit the I-K distance to make smaller than the I-K distance in case of FIG. 9.

As shown in FIGS. 2 and 3, the wheel carrier 30 has oblique portions 31d extending bifurcatedly upward from a portion 31c surrounding the supported portion of the hub, and a horizontal portion 31e extending from each portion 31d in the lateral direction of the vehicle body. The upper portion 31a extends upright from the horizontal portions 31e. Each of the oblique portions 31d is provided with a bracket 102, and a pin 104 is studed in each bracket 102.

The brake caliper 36 of the structure known per se for generating a braking force in cooperation with the brake disk is slidably mounted to the pin 104, and pads 106 (See FIG. 1) are disposed so as to sandwich the brake disk 40. If the brake caliper 36 is disposed above the drive shaft 34 as shown in FIG. 1, the interference in steering of the brake caliper 36 with the drive shaft 34 is prevented.

Figure 4:
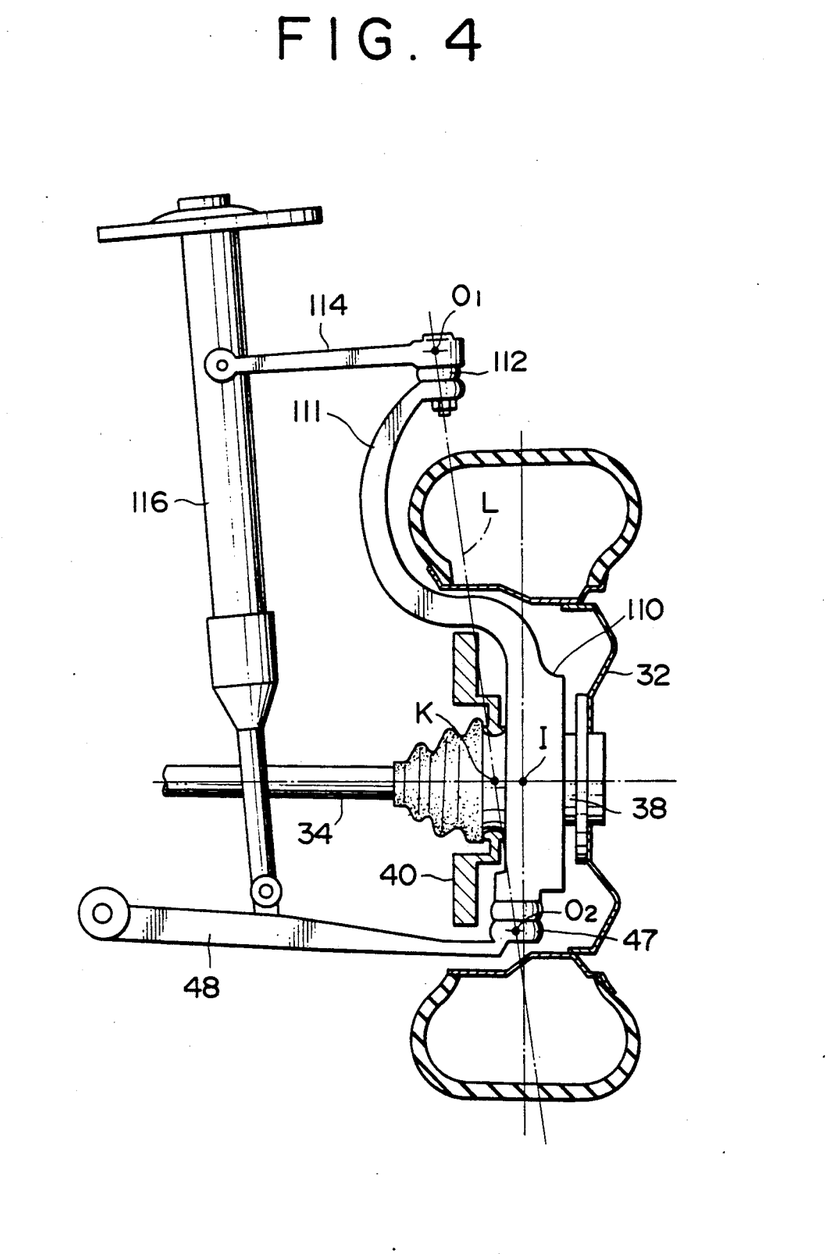
FIG. 4 is a front view, partly in section, showing another embodiment of the suspension according to the present invention.

FIG. 4 shows an embodiment of a suspension of a double wishbone type, in which a wheel carrier 110 is swingably connected to the suspension arm 48 through the ball joint 47, and an upper portion of the wheel carrier 110 is swingably connected to a suspension arm 114 through a ball joint 112. The suspension arm 114 is swingably connected to a shock absorber 116. In case of this suspension, the steering axis L is provided as a straight line connecting the center $O_1$ of the ball joint 112 with the center $O_2$ of the ball joint 47.

The hub 38 and the brake disk 40 in this embodiment are similar to those in the above-mentioned embodiment. Accordingly, the ball joint 47 is located more laterally outward of the vehicle body than the bake disk 40, and the I-K distance is made small. If an upper portion 111 of the wheel carrier 110 is so formed to project outward as shown in this embodiment, the I-K distance is made smaller.

According to the suspension in the above-mentioned embodiments, when the drive shaft 34 is rotated, the moment for rotating the wheel 32 around the steering axis L is generated by a driving force. However, since the I-K distance is small, this moment is made small. Thus, a steering effort can be made small.

According to the suspension shown in FIG. 1, though the wheel carrier 30 rotates around the steering axis L obtained by interconnecting the center $O_1$ of the support 44 and the center $O_2$ of the ball joint 47, the displacement of the centers $O_1$ and $O_2$ resulting from the rotation of the wheel carrier 30 is small. Thus, an alignment change is made small.

Figure 8:
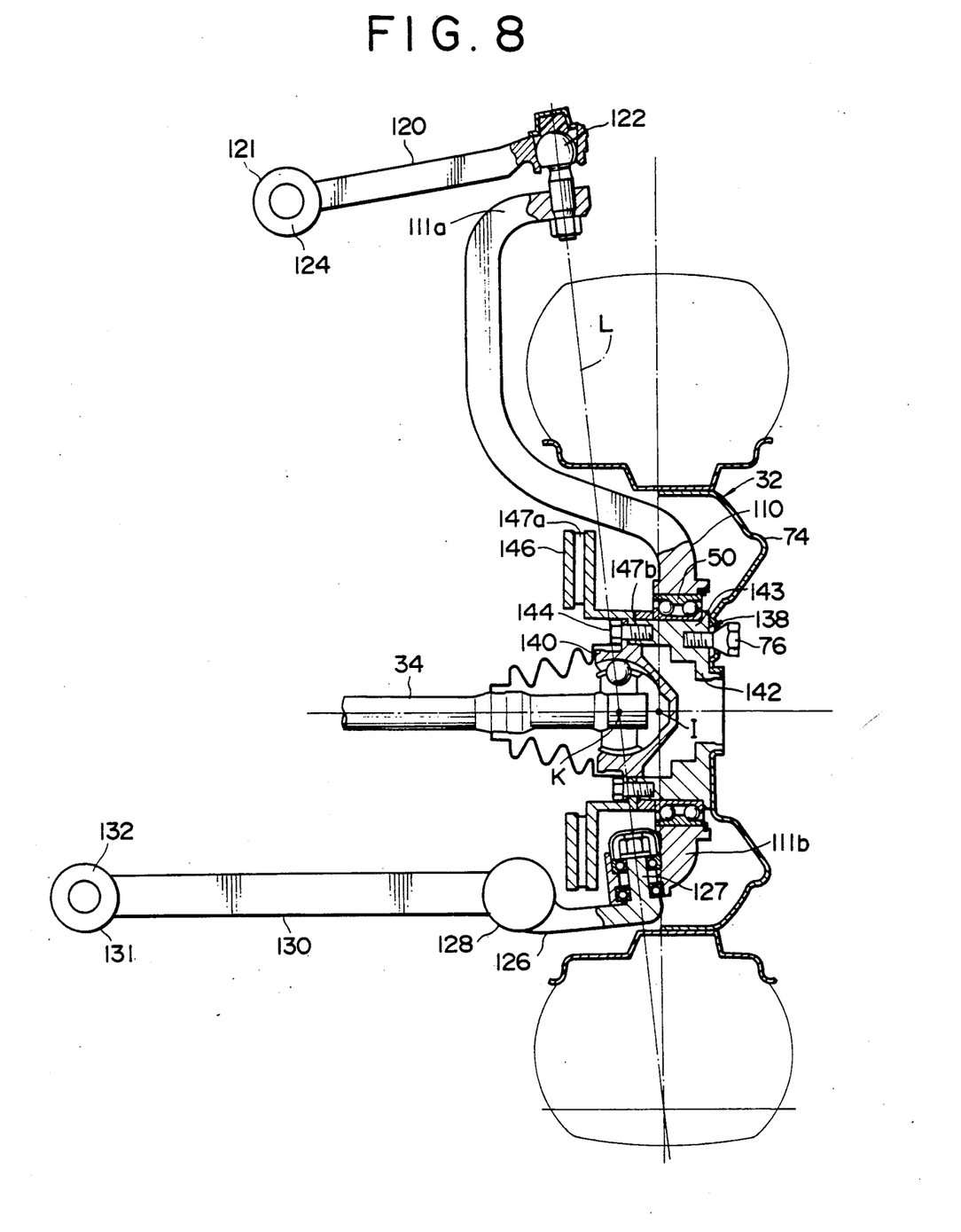
FIG. 8 is a front view, partly in section, showing a further embodiment of the suspension according to the present invention.

FIG. 8 shows another embodiment of a suspension of a double wishbone type.

The wheel carrier 110 in this embodiment is substantially similar to that shown in FIG. 4, and an upper portion 111a of the wheel carrier 110 is swingably connected to an upper suspension arm 120 through a ball joint 122. The suspension arm 120 takes the V or A-like plane shape, and is connected swingably around a longitudinally extending axis to the vehicle body through a bushing 124 mounted to each of two inward ends 121 longitudinally disposed at an interval.

The wheel carrier 110 has a lower portion 111b rotatably connected to a shaft portion 127 of a connection arm 126. The line connecting an axis of the shaft portion 127 with the center of the ball joint 122 is coincident with the steering axis L, so that the steering operation is ensured by the shaft portion 127. The connection arm 126 is swingably connected to a suspension arm 130 through a joint 128 having a longitudinally extending axis. The bound and rebound are ensured by the joint 128.

The suspension arm 130 takes the V or A-like plane shape, and is connected swingably around a longitudinally extending axis to the vehicle body through a bushing 132 mounted to each of two inward ends 131 longitudinally disposed at an interval.

A hub 138 includes two members 140, 142, which are joined together by bolts 144. The member 140 serves as the casing of the constant velocity joint, and the shaft 34 is connected to the member 140. On the other hand, the member 142 has a supported portion 143 rotatably supported by the wheel carrier 110 through the bearing 50. Then, the disk wheel 74 of the wheel 32 is mounted to a portion of the member 142 located laterally outward of the vehicle body than the supported portion 143 by the bolts 76.

A brake disk 146 has radiating gaps 147a, and is provided with an annular connecting portion 147b. The annular connecting portion 147b is sandwiched between the members 140, 142, and the brake disk 146 is attached to the hub 138 by the bolts 144.

According to the suspension shown in FIG. 8, when the wheel carrier 110 is steered by a steering gear (not shown), the wheel carrier 110 rotates around the steering axis L defined by the ball joint 122 and the shaft portion 127.

Also, the bound and rebound result in a four-articulatory linking motion with the bushing 124, the ball joint 122, the joint 128 and the bushing 132 as nodes, so that a change of a chamber angle or the like presents satisfactory characteristics. Then, since the connection arm 126 does not move relative to the wheel carrier 110, the connection arm 126 can be positioned as close as possible to the brake disk 146.

What is claimed is:

1. A suspension for a steerable driving wheel in a vehicle, in which a wheel supported by a wheel carrier rotatable around a steering axis is driven by a drive shaft and braked by a brake caliper located above said drive shaft, comprising:

a hub having a supported portion rotatably supported by said wheel carrier through a bearing, said hub being unrotatably connected to said drive shaft and attaching said wheel to a portion located more laterally outward of a vehicle body than said supported portion; and a brake disk for generating a braking force in cooperation with said brake caliper, said brake disk being fixed to said hub through an annular fixing portion thereof and having an annular brake portion located more laterally inward of said vehicle body than said supported portion and connected to the annular fixing portion, said brake disk further having a disk portion connected to the annular brake portion for cooperating with said brake caliper, wherein said wheel carrier is swingably connected to a suspension arm at a portion thereof located below said support portion.

2. A suspension as claimed in claim 1, wherein said supported portion of the hub has a plurality of ball grooves provided on an inner peripheral surface thereof, and said drive shaft has a race with a plurality of ball grooves provided on an outer peripheral surface thereof, the race being inserted into the supported portion, and wherein a ball of a size extending from each ball groove of the race to each ball groove of the hub is disposed between the race and the hub to constitute a constant velocity joint.

3. A suspension as claimed in claim 1, wherein said brake disk is provided integrally with a cylindrical connecting portion which is fitted and fixed to said supported portion of the hub.

4. A suspension as claimed in claim 1, wherein said hub includes two members to be united to each other, and wherein said brake disk is provided integrally with a connecting portion which is sandwiched by and fixed to said two members of the hub.

5. A suspension as claimed in claim 4, wherein said two members have respective surfaces confronting each other, said surfaces being provided with radial grooves.

6. A suspension as claimed in claim 1, wherein said wheel carrier has oblique portions extending bifurcatedly upward from a portion surrounding said supported portion of the hub, a horizontal portion extending from each said oblique portion in the lateral direction of the vehicle body and an upper portion extending upward from the horizontal portions.

7. A suspension as claimed in claim 6, wherein said brake caliper is disposed between said oblique portions above said drive shaft.

8. A suspension as claimed in claim 1, wherein said suspension is of a strut type provided with a strut, the strut having an upper end swingably connected to the vehicle body through a support and a lower end connected to said wheel carrier, and wherein said steering axis is an axis interconnecting the center of said support and the center of the connection between said portion of the wheel carrier located below the supported portion of the hub and said suspension arm.

9. A suspension as claimed in claim 1, wherein said suspension is of a double wishbone type further provided with an upper arm, the upper arm being swingably connected to an upper portion of said wheel carrier, and wherein said steering axis is an axis interconnecting the center of the connection between said upper arm and said upper portion of the wheel carrier and the center of the connection between said portion of the wheel carrier located below the supported portion of the hub and said suspension arm.

10. A suspension as claimed in claim 9, wherein said upper portion of the wheel carrier connected to said upper arm is formed to project laterally outward of the vehicle body.

11. A double wishbone type suspension for a steerable driving wheel in a vehicle, in which a wheel supported by a wheel carrier is driven by a drive shaft and braked by a brake caliper located above said drive shaft, and the wheel carrier is swingably supported by an upper arm and a lower arm, the wheel carrier being rotatable around a steering axis, comprising:
a hub having a support portion rotatably supported by said wheel carrier through a drive shaft and hub being unrotatably connected to said drive shaft and attaching said wheel to a portion located more laterally outward of a vehicle body than said supported portion;
a brake disk for generating a braking force in cooperation with said brake caliper, said brake disk being fixed to said hub through an annular fixing portion thereof and having an annular brake portion located more laterally inward of said vehicle body than said supported portion and connected to the annular fixing portion, said brake disk further having a disk portion connected to the annular brake portion for cooperating with said brake caliper; and
a connecting arm having a shaft portion rotatably connected to a portion of said wheel carrier located below said supported portion, the connecting arm being swingably connected to said lower arm through a joint having a longitudinally extending axis.

12. A suspension as claimed in claim 11, wherein an axis of said shaft portion of the connecting arm coincides with said steering axis.

13. A suspension for a steerable driving wheel in a vehicle, in which a wheel supported by a wheel carrier rotatable around a steering axis is driven by a drive shaft and braked by a brake caliper, comprising:
a hub having a supported portion rotatably supported by said wheel carrier through a bearing, said hub being unrotatably connected to said drive shaft and attaching said wheel to a portion located more laterally outward of a vehicle body than said supported portion and wherein said hub includes two members to be united to each other; and
a brake disk for generating a braking force in cooperation with said brake caliper, said brake disk being provided on said hub and disposed more laterally inward of said vehicle body than said supported portion, and wherein said brake disk is provided integrally with a connecting portion which is sandwiched by and fixed to said two members of the hub;
wherein said wheel carrier is swingably connected to a suspension arm at a portion thereof located below said supported portion.

14. A suspension for a steerable driving wheel in a vehicle, in which a wheel supported by a wheel carrier rotatable around a steering axis is driven by a drive shaft and braked by a brake caliper, comprising:
a hub having a supported portion rotatably supported by said wheel carrier through a bearing, said hub being unrotatably connected to said drive shaft and attaching said wheel to a portion located more laterally outward of a vehicle body than said supported portion; and
a brake disk for generating a braking force in cooperation with said brake caliper, said brake disk being provided on said hub and disposed more laterally inward of said vehicle body than said supported portion;
wherein said wheel carrier is swingably connected to a suspension arm at a portion thereof located below said supported portion, and has oblique portions extending bifurcatedly upward from a portion surrounding said supported portion of the hub, a horizontal portion extending from each of said oblique portion in the lateral direction of the vehicle body and an upper portion extending upward from the horizontal portions.

* * * * *